United States Patent
Toyama

(10) Patent No.: US 10,081,386 B2
(45) Date of Patent: Sep. 25, 2018

(54) TORQUE DETECTION DEVICE AND ELECTRIC POWER STEERING SYSTEM

(71) Applicant: JTEKT CORPORATION, Osaka-shi, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/653,946

(22) Filed: Jul. 19, 2017

(65) Prior Publication Data

US 2018/0029634 A1 Feb. 1, 2018

(30) Foreign Application Priority Data

Jul. 27, 2016 (JP) .................................. 2016-147770

(51) Int. Cl.
*G01L 3/04* (2006.01)
*B62D 5/04* (2006.01)
(Continued)

(52) U.S. Cl.
CPC ......... *B62D 5/0463* (2013.01); *B62D 5/0481* (2013.01); *G01L 3/04* (2013.01);
(Continued)

(58) Field of Classification Search
CPC ... G01L 3/104; G01L 3/10; G01L 3/04; G01L 3/02; G01L 3/1435; G01L 3/101;
(Continued)

(56) References Cited

U.S. PATENT DOCUMENTS 5,646,523 A * 7/1997 Kaiser .................... B62D 15/02
180/400
6,956,198 B2 * 10/2005 Alsobrooks .......... B62D 15/022
250/231.13
(Continued)

FOREIGN PATENT DOCUMENTS

| EP | 2644476 A2 | 10/2013 |
| JP | 2014-029304 A | 2/2014 |
| JP | 2015-031600 A | 2/2015 |

OTHER PUBLICATIONS

Jan. 3, 2018 Search Report issued in European Patent Application No. 17182855.1.

*Primary Examiner* — Jonathan Dunlap
(74) *Attorney, Agent, or Firm* — Oliff PLC

(57) ABSTRACT

A torque detection device capable of suppressing intrusion of static electricity thereinto. A magnetism collection unit includes magnetism collection rings, first and second magnetism collection holders that hold the magnetism collection rings, respectively, and a magnetic shield that covers the outer peripheries of the magnetism collection rings. The inner peripheral surface of the first magnetism collection holder is provided with recessed portions. The outer peripheral surface of the second magnetism collection holder is provided with engagement protrusions to be inserted into the recessed portions. The inner peripheral surface of the second magnetism collection holder is provided with recessed portions. The inner peripheral surface of the first magnetism collection holder is provided with protrusions that project toward the second magnetism collection holder. The protrusions are inserted into the recessed portions when the first magnetism collection holder and the second magnetism collection holder are assembled to each other.

5 Claims, 4 Drawing Sheets

(51) Int. Cl.
*G01L 3/10* (2006.01)
*B62D 15/02* (2006.01)
*G01L 3/02* (2006.01)
*G01L 3/14* (2006.01)
*G01D 11/24* (2006.01)
*G01L 5/22* (2006.01)
*G01L 25/00* (2006.01)

(52) U.S. Cl.
CPC ...... *B62D 15/0215* (2013.01); *B62D 15/0235* (2013.01); *B62D 15/0245* (2013.01); *G01D 11/245* (2013.01); *G01L 3/02* (2013.01); *G01L 3/10* (2013.01); *G01L 3/101* (2013.01); *G01L 3/1435* (2013.01); *G01L 5/221* (2013.01); *G01L 25/003* (2013.01)

(58) Field of Classification Search
CPC ... G01L 5/221; G01L 25/003; B62D 15/0215; B62D 15/0245; B62D 15/0235; B62D 5/0463; B62D 5/0481; G01D 11/245
USPC ........ 73/117.02, 862.191, 862.325, 862.193, 73/862.195, 862.08, 862.326, 73/862.331–862.336; 324/207.2, 207.25, 324/207.22
See application file for complete search history.

(56) References Cited

U.S. PATENT DOCUMENTS

| | | | |
|---|---|---|---|
| 7,021,161 B2* | 4/2006 | Recio | G01D 5/04 73/862 |
| 7,406,884 B2* | 8/2008 | Jerems | G01L 5/221 73/862.331 |
| 7,415,896 B2* | 8/2008 | Khoury | G01L 3/106 73/862.193 |
| 7,726,208 B2* | 6/2010 | Hoeller | B62D 6/10 324/207.17 |
| 8,375,810 B2* | 2/2013 | Bae | G01L 3/10 73/862.334 |
| 8,397,588 B2* | 3/2013 | Kang | G01B 7/30 73/862.08 |
| 8,561,481 B2* | 10/2013 | Bae | G01L 3/10 73/862.334 |
| 8,590,370 B2* | 11/2013 | Lee | B62D 6/10 73/117.02 |
| 8,813,578 B2* | 8/2014 | Kaess | B62D 6/10 324/207.2 |
| 8,955,396 B2* | 2/2015 | Bae | G01L 3/10 73/862.334 |
| 9,255,857 B2* | 2/2016 | Hotta | G01L 3/104 |
| 9,389,148 B2* | 7/2016 | Lee | B62D 6/10 |
| 9,500,543 B2* | 11/2016 | Lee | G01L 3/104 |
| 2003/0010138 A1* | 1/2003 | Madni | G01L 3/106 73/862.337 |
| 2006/0081070 A1* | 4/2006 | Madni | G01D 5/202 73/862.325 |
| 2008/0150519 A1* | 6/2008 | Hoeller | B62D 6/10 324/207.2 |
| 2009/0289623 A1* | 11/2009 | Sano | G01D 11/245 324/207.25 |
| 2010/0319466 A1* | 12/2010 | Bae | G01L 3/104 73/862.325 |
| 2011/0247408 A1* | 10/2011 | Lee | B62D 6/10 73/117.02 |
| 2012/0152034 A1* | 6/2012 | Kaess | B62D 6/10 73/862.333 |
| 2013/0125668 A1* | 5/2013 | Bae | G01L 3/104 73/862.325 |
| 2013/0305843 A1* | 11/2013 | Lee | G01L 3/104 73/862.325 |
| 2014/0013863 A1* | 1/2014 | Bae | G01L 3/104 73/862.333 |
| 2014/0047914 A1* | 2/2014 | Lee | B62D 6/10 73/117.02 |
| 2015/0033877 A1* | 2/2015 | Hotta | B62D 5/0481 73/862.193 |
| 2015/0300898 A1* | 10/2015 | Lee | G01L 3/104 73/862.325 |
| 2017/0312955 A1* | 11/2017 | Yukimura | B29C 45/14336 |
| 2017/0315004 A1* | 11/2017 | Toyama | G01L 3/104 |

* cited by examiner

TORQUE DETECTION DEVICE AND ELECTRIC POWER STEERING SYSTEM

INCORPORATION BY REFERENCE

The disclosure of Japanese Patent Application No. 2016-147770 filed on Jul. 27, 2016 including the specification, drawings and abstract, is incorporated herein by reference in its entirety.

BACKGROUND OF THE INVENTION

1. Field of the Invention

The present invention relates to a torque detection device and an electric power steering system that includes the torque detection device.

2. Description of Related Art

There has hitherto been known a torque detection device that detects torque applied to a rotary shaft as described in Japanese Patent Application Publication No. 2015-31600 (JP 2015-31600 A) and Japanese Patent Application Publication No. 2014-29304 (JP 2014-29304 A). The rotary shaft is constituted of an input shaft on the input side, an output shaft on the output side, and a torsion bar that couples the input shaft and the output shaft to each other.

The torque detection device has a permanent magnet fixed to the input shaft, a plurality of magnetic yokes that are fixed to the output shaft and that form a magnetic circuit that matches the magnetic field of the permanent magnet, a pair of magnetism collection rings that guide magnetic flux from the magnetic yokes, a magnetism collection holder that holds the magnetism collection rings and that is made of an insulator, and a magnetic sensor that detects magnetic flux guided to the magnetism collection rings. Such a torque detection device is occasionally provided with a magnetic shield provided on the outer periphery of the magnetism collection holder so as to surround the periphery of the magnetism collection ring in order to block noise from an external magnetic field. The magnetic shield blocks external magnetic field noise that affects the torque detection device such as switching noise from a device mounted on a vehicle, for example.

The magnetism collection holder of the torque detection device according to JP 2015-31600 A is constituted by assembling a pair of separated holders to each other. The magnetism collection holder of the torque detection device according to JP 2014-29304 A is provided with a clearance for positioning during molding.

The outer surface of the magnetic shield may be hit by static electricity generated because of various factors. The static electricity is transmitted over the outer surface of the magnetic shield, and therefore may be transmitted into the magnetism collection ring through a clearance provided in the magnetism collection holder. The static electricity transmitted to the magnetism collection ring flows into the magnetic sensor through the magnetism collection ring, and thus may cause an abnormality in an integrated circuit (IC) of the magnetic sensor.

SUMMARY OF THE INVENTION

It is an object of the present invention to provide a torque detection device capable of suppressing intrusion of static electricity into a magnetism collection holder and an electric power steering system that includes the torque detection device.

An aspect of the present invention provides a torque detection device including:

a permanent magnet;

a magnetic yoke which is disposed in a magnetic field formed by the permanent magnet and a position of which relative to the permanent magnet is variable in accordance with a torsional angle of a torsion bar;

a tubular magnetism collection unit that has a tubular magnetism collection holder, a magnetism collection ring, and a magnetic shield, the magnetism collection holder being composed of a first magnetism collection holder and a second magnetism collection holder, which are disposed adjacent to each other in an axial direction and assembled to each other, to surround the magnetic yoke, the magnetism collection ring being attached to an inner peripheral surface of the magnetism collection holder to collect magnetic flux of the magnetic yoke, and the magnetic shield being fitted with an outer peripheral surface of the magnetism collection holder to be attached; and a magnetic sensor that detects magnetic flux from a magnetic circuit formed by the permanent magnet, the magnetic yoke, and the magnetism collection ring, in which the first magnetism collection holder is provided with a first positioning recessed portion and a first protrusion, and the second magnetism collection holder is provided with a second protrusion and a second positioning recessed portion, the second protrusion being inserted into the first positioning recessed portion and the first protrusion being inserted into the second positioning recessed portion with the first magnetism collection holder and the second magnetism collection holder assembled to each other.

With this configuration, even in the case where the first magnetism collection holder and the second magnetism collection holder are provided with the first positioning recessed portion and the second positioning recessed portion, the second protrusion is inserted into the first positioning recessed portion, and the first protrusion is inserted into the second positioning recessed portion. Consequently, when the first magnetism collection holder and the second magnetism collection holder are assembled to each other, a clearance between the first positioning recessed portion and the second positioning recessed portion is filled with the first protrusion and the second protrusion, and therefore communication between the inside and the outside of the magnetism collection holder via the first positioning recessed portion and the second positioning recessed portion is blocked. The periphery of the magnetism collection ring is filled with the magnetism collection holder without a clearance. Therefore, even if static electricity generated outside the magnetism collection ring would flow into the magnetism collection ring, which is covered by the magnetism collection holder, an inflow of static electricity into the magnetism collection ring is suppressed. Therefore, intrusion of static electricity into the magnetism collection holder from the outside of the magnetism collection holder is suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
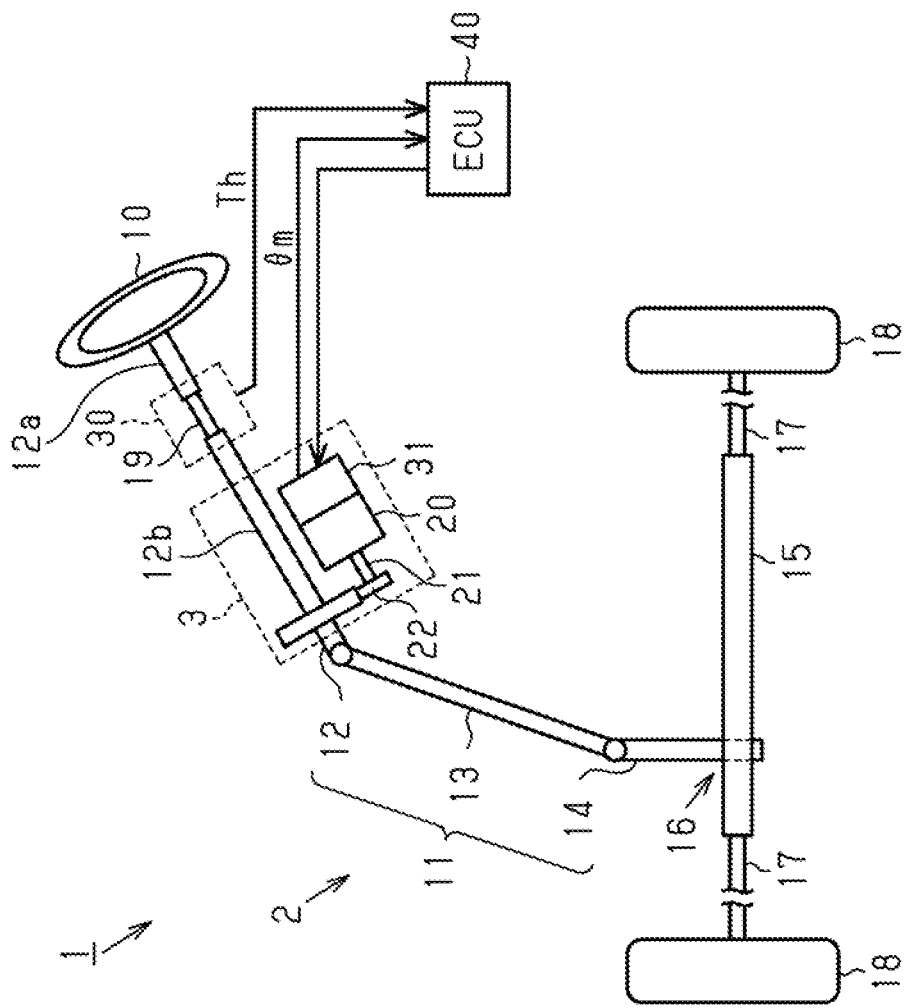
FIG. 1 illustrates a schematic configuration of an electric power steering system according to an embodiment.

An embodiment in which a torque detection device according to the present invention is applied to an electric power steering system (hereinafter referred to as an "EPS") will be described below. As illustrated in FIG. 1, the EPS 1 includes a steering mechanism 2 that steers steered wheels 18 on the basis of an operation of a steering wheel 10 performed by a driver, an assist mechanism 3 that assists the driver in performing a steering operation, and an electronic control unit (ECU) 40 that controls the assist mechanism 3.

The steering mechanism 2 includes the steering wheel 10 and a steering shaft 11 that rotates together with the steering wheel 10. The steering shaft 11 has a column shaft 12 coupled to the steering wheel 10, an intermediate shaft 13 coupled to the lower end portion of the column shaft 12, and a pinion shaft 14 coupled to the lower end portion of the intermediate shaft 13. The lower end portion of the pinion shaft 14 is coupled to a rack shaft 15, which serves as a steered shaft, via a rack-and-pinion mechanism 16. Thus, in the steering mechanism 2, rotational motion of the steering shaft 11 is converted into reciprocal linear motion in the axial direction of the rack shaft 15 (the right-left direction in FIG. 1) via the rack-and-pinion mechanism 16 which is composed of a pinion gear provided at the distal end of the pinion shaft 14 and a rack provided on the rack shaft 15. The reciprocal linear motion is transferred to the right and left steered wheels 18 via tie rods 17 coupled to both ends of the rack shaft 15 to vary the steered angle of the steered wheels 18 to change the advancing direction of the vehicle.

The assist mechanism 3 includes a motor 20 that applies an assist force to the steering shaft 11. A rotary shaft 21 of the motor 20 is coupled to the column shaft 12 via a speed reduction mechanism 22. The speed reduction mechanism 22 reduces the speed of rotation of the motor 20, and transfers a rotational force at the reduced speed to the column shaft 12. That is, a rotational force (motor torque) of the motor 20 is applied to the steering shaft 11 as an assist force to assist the driver in performing a steering operation. Examples of the motor 20 include a three-phase brushless motor that is rotated on the basis of drive electric power with three phases (U-, V-, and W-phases).

The ECU 40 controls the motor 20 on the basis of the results of detection performed by various sensors provided in the vehicle. Examples of the various sensors include a torque sensor 30 that serves as the torque detection device, and a rotational angle sensor 31. The torque sensor 30 is provided to the column shaft 12. The rotational angle sensor 31 is provided to the motor 20. The column shaft 12 is constituted of an input shaft 12a on the steering wheel 10 side and an output shaft 12b on the intermediate shaft 13 side. The input shaft 12a and the output shaft 12b are coupled to each other by a torsion bar 19. The torsion bar 19 is deformed to be warped when an operation force of the steering wheel 10 is transferred to the output shaft 12b via the input shaft 12a. The torque sensor 30 detects steering torque Th applied to the steering shaft 11 on the basis of a warp in the torsion bar 19 caused along with a steering operation performed by the driver. The rotational angle sensor 31 detects a rotational angle $\theta m$ of the rotary shaft 21. The ECU 40 sets a target assist force on the basis of outputs from the sensors, and controls a current supplied to the motor 20 such that the actual assist force becomes the target assist force.

Figure 2:
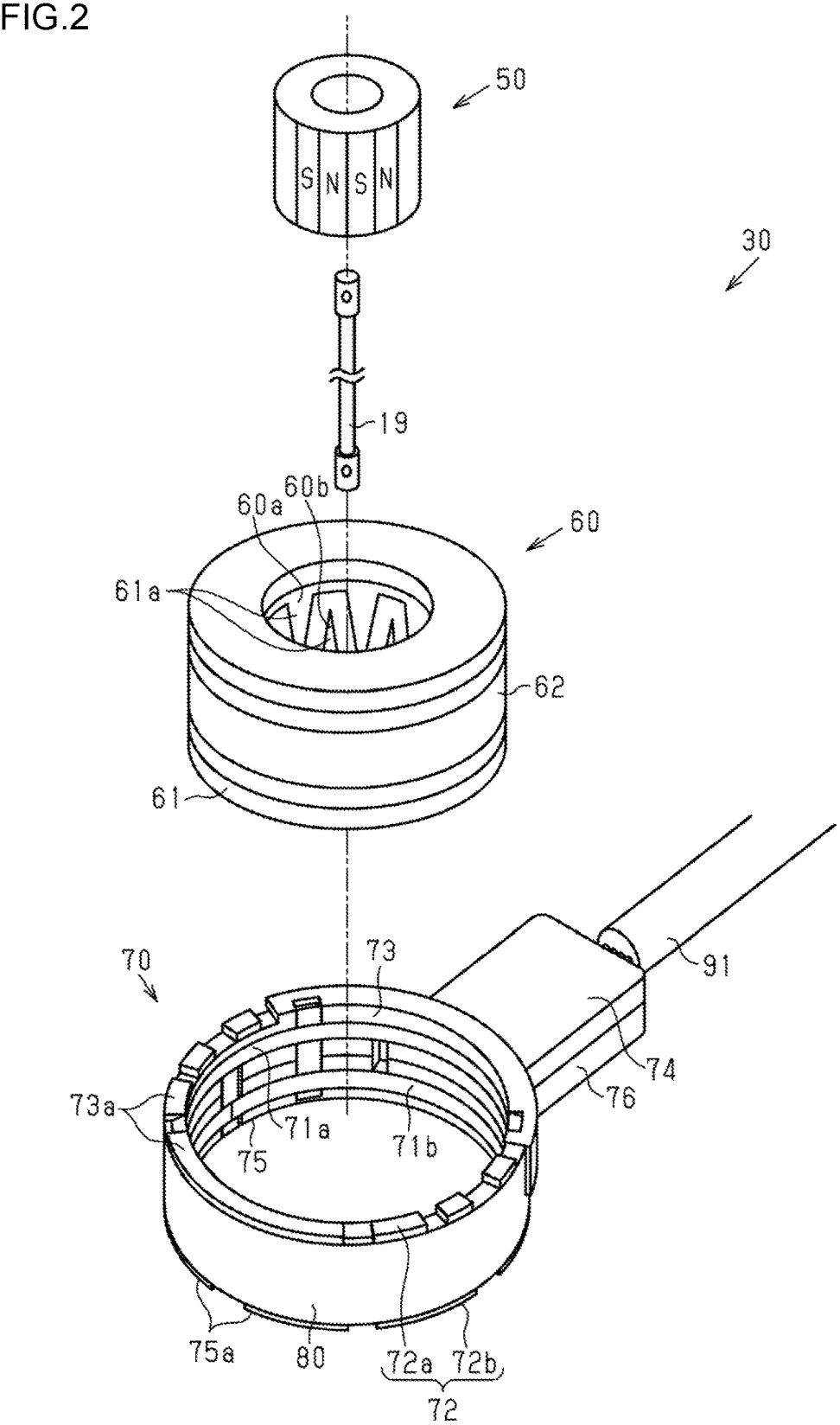
FIG. 2 is an exploded perspective view illustrating the configuration of a torque detection device of the electric power steering system according to the embodiment.

The torque sensor 30 (torque detection device) will be described in detail. As illustrated in FIG. 2, the torque sensor 30 has the torsion bar 19, a permanent magnet 50 coupled to the input shaft 12a, a cylindrical yoke 60 coupled to the output shaft 12b, and a tubular magnetism collection unit 70 disposed so as to cover the periphery of the yoke 60.

The yoke 60 is disposed coaxially with the output shaft 12b. The yoke 60 is provided around the permanent magnet 50 with a certain clearance therefrom. The yoke 60 includes two magnetic yokes 60a and 60b. The magnetic yokes 60a and 60b each include lugs 61a in an isosceles triangle shape provided at equal intervals in the circumferential direction to extend in a direction that is perpendicular to a flat surface of a plate-shaped annular portion 61. The lugs 61a are molded in a synthetic resin body 62 with the respective lugs 61a facing each other in the axial direction as displaced at certain intervals in the circumferential direction. Surfaces of the magnetic yokes 60a and 60b that face the permanent magnet 50 are exposed from the synthetic resin body 62.

In a neutral state in which torque is not applied to the input shaft 12a, the distal ends of the respective lugs 61a of the magnetic yokes 60a and 60b point toward the boundaries between the N poles and the S poles of the permanent magnet 50.

The magnetism collection unit 70 includes: two magnetism collection rings 71a and 71b that guide magnetic flux from the magnetic yokes 60a and 60b, respectively; first and second magnetism collection holders 72a and 72b that holds the magnetism collection rings 71a and 71b, respectively; and a magnetic shield 80 that covers the outer peripheries of the magnetism collection rings 71a and 71b. The first magnetism collection holder 72a and the second magnetism collection holder 72b constitute a magnetism collection holder 72. That is, the magnetism collection holder 72 is constituted from the first magnetism collection holder 72a and the second magnetism collection holder 72b which are separated from each other in the axial direction. In other words, the first magnetism collection holder 72a and the second magnetism collection holder 72b are disposed adjacent to each other in the axial direction, and assembled to each other to constitute a tubular magnetism collection holder 72.

Figure 3:
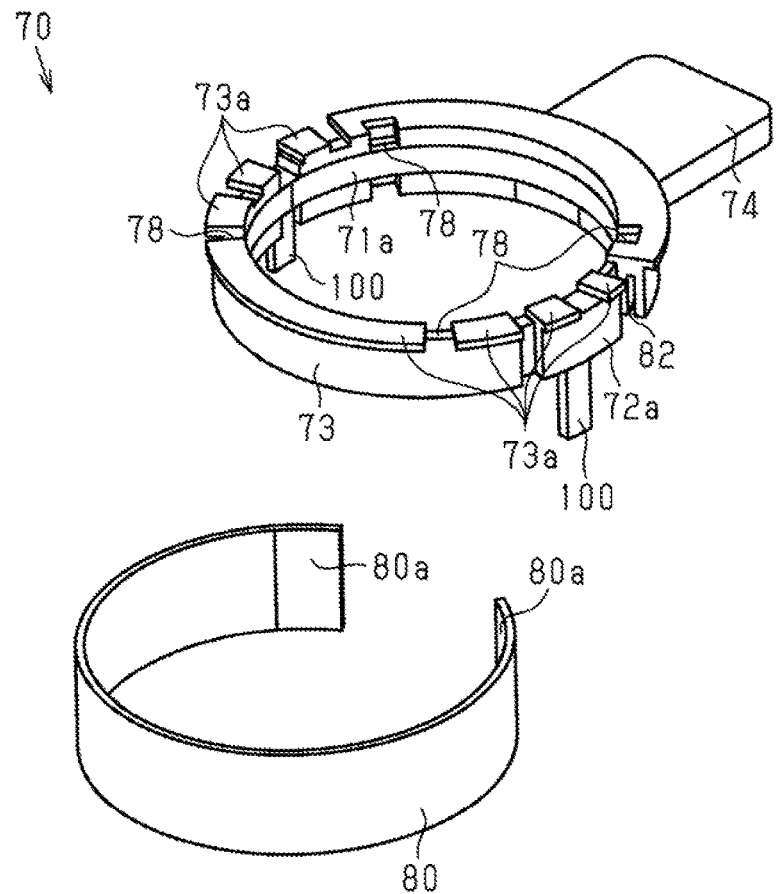
FIG. 3 is an exploded perspective view of a magnetism collection unit of the torque detection device of the electric power steering system according to the embodiment.
Figure 3:
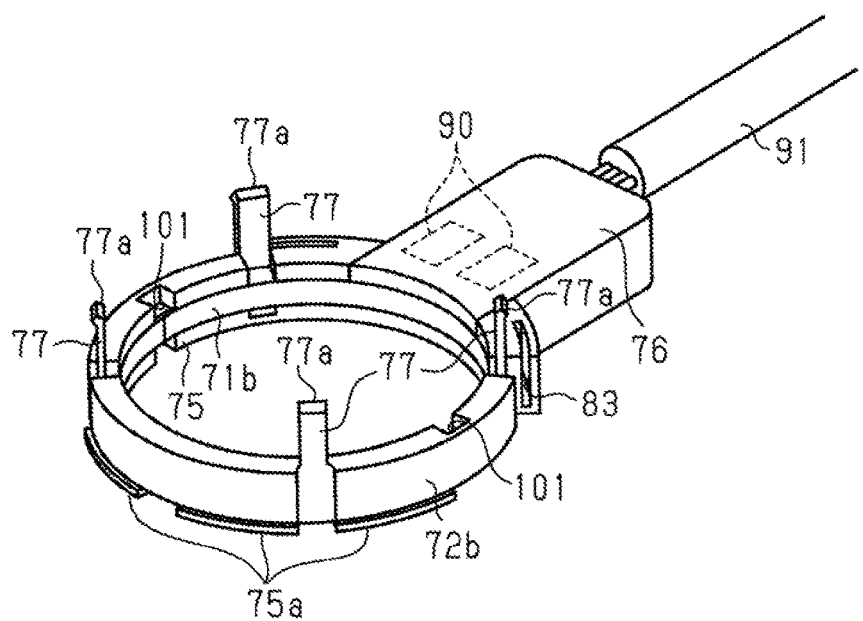

As illustrated in FIG. 3, the first magnetism collection holder 72a has an annular first ring portion 73 and a substrate housing portion 74 integrally coupled to the outer peripheral surface of the first ring portion 73 to project radially outward. The first magnetism collection holder 72a is made of a synthetic resin, for example. The magnetism collection ring 71a is held on the inner peripheral surface of the first ring portion 73, and the inner peripheral surface of the first ring portion 73 faces the outer peripheral surface of the yoke 60 via a clearance in the radial direction. The magnetic yoke 60a and the magnetism collection ring 71a face each other via a clearance in the radial direction. In addition, the magnetic yoke 60b and the magnetism collection ring 71b face each other via a clearance in the radial direction. A plurality of (four) recessed portions 78 (positioning holes) are provided in the inner peripheral surface of the first ring portion 73.

A plurality of flange portions 73a that project radially outward are provided on an end surface of the first ring portion 73 on the opposite side of the second magnetism collection holder 72b. As illustrated in FIG. 3, the second magnetism collection holder 72b has an annular second ring portion 75 and a rectangular plate-shaped substrate housing portion 76 integrally coupled to the outer peripheral surface of the second ring portion 75 to project radially outward. The second magnetism collection holder 72b is made of a synthetic resin, for example. A substrate provided with Hall ICs 90 is disposed in the substrate housing portion 76. The inside diameter and the outside diameter of the second ring portion 75 are the same as the inside diameter and the outside diameter, respectively, of the first ring portion 73 of the first magnetism collection holder 72a. The magnetism collection ring 71b is held on the inner peripheral surface of the second ring portion 75. The magnetic yoke 60a and the magnetism collection ring 71b are disposed so as to face each other via a clearance in the radial direction. In addition, the magnetic yoke 60b and the magnetism collection ring 71b are disposed so as to face each other via a clearance in the radial direction. A plurality of (two) recessed portions 101 (positioning holes) are provided in the inner peripheral surface of the second ring portion 75 of the second magnetism collection holder 72b. The plurality of recessed portions 101 are provided for positioning during molding of the second magnetism collection holder 72b.

A plurality of (four) engagement protrusions 77 that project toward the first magnetism collection holder 72a are provided on the outer surface of the second ring portion 75 of the second magnetism collection holder 72b. When engagement lugs 77a provided at the distal ends of the engagement protrusions 77 are engaged with an end surface of the first ring portion 73 of the first magnetism collection holder 72a in the axial direction, the plurality of engagement protrusions 77 are inserted into the respective recessed portions 78 of the first magnetism collection holder 72a. The second magnetism collection holder 72b is coupled coaxially with the first magnetism collection holder 72a with the engagement lugs 77a of the engagement protrusions 77 engaged with an end surface of the first ring portion 73 in the axial direction.

As illustrated in FIG. 3, in addition, a plurality of flange portions 75a that project radially outward are provided on an end surface of the second ring portion 75 on the opposite side of the first magnetism collection holder 72a. The magnetism collection ring 71a and the magnetism collection ring 71b are assembled in parallel with each other. The Hall ICs 90 are housed in the substrate housing portion 76. The Hall ICs 90 are connected to the ECU 40, which is external, via a cord 91 (see FIG. 1).

The magnetic shield 80 is fitted with the outer peripheral surface of the first ring portion 73 and the outer peripheral surface of the second ring portion 75. A material that can block magnetism such as metal, for example, is adopted as the material of the magnetic shield 80. The magnetic shield 80 is provided as curved in a C-shape in cross section. In addition, the length of the magnetic shield 80 in the axial direction is slightly larger than the total of the respective lengths of the first ring portion 73 and the second ring portion 75 in the axial direction. When the engagement lugs 77a of the engagement protrusions 77 are engaged with an end portion of the first ring portion 73 in the axial direction, both end portions of the magnetic shield 80 in the axial direction abut against the flange portions 73a of the first ring portion 73 and the flange portions 75a of the second ring portion 75 in the axial direction. Engagement grooves 82 are provided at portions of the outer peripheral surface of the first magnetism collection holder 72a corresponding to both end portions 80a of the magnetic shield 80. In addition, engagement grooves 83 are provided at portions of the outer peripheral surface of the second magnetism collection holder 72b corresponding to both end portions 80a of the magnetic shield 80 in the circumferential direction. The magnetic shield 80 is fixed to the first magnetism collection holder 72a and the second magnetism collection holder 72b with both end portions 80a of the magnetic shield 80 inserted into the engagement grooves 82 and 83.

As illustrated in FIG. 3, a plurality of (two) protrusions 100 that project toward the second magnetism collection holder 72b are provided on the inner peripheral surface of the first ring portion 73 of the first magnetism collection holder 72a. The plurality of protrusions 100 are provided at positions that are different from those of the recessed portions 78 in the circumferential direction of the first magnetism collection holder 72a. In addition, the plurality of protrusions 100 are provided at positions that are different from positions corresponding to the engagement protrusions 77 of the second magnetism collection, holder 72b in the circumferential direction of the first magnetism collection holder 72a. When the first magnetism collection holder 72a and the second magnetism collection holder 72b are assembled to each other with the engagement lugs 77a, which are provided at the distal ends of the engagement protrusions 77, engaged with an end surface of the first ring portion 73 of the first magnetism collection holder 72a in the axial direction, the plurality of recessed portions 101 of the second magnetism collection holder 72b are filled with the plurality of protrusions 100.

The function and the effect of the embodiment will be described. The outer surface of the magnetic shield 80 may be hit by static electricity generated because of various factors. In particular, the magnetic shield 80 is made of metal, for example, and therefore tends to attract static electricity. When the static electricity intrudes into the torque sensor 30, that is, into the magnetic shield 80, to be transmitted to the magnetism collection rings 71a and 71b, the static electricity may flow into the Hall ICs 90. When the static electricity flows into the Hall ICs 90, a certain abnormality may be caused in the Hall ICs 90.

In the embodiment, in this respect, the first ring portion 73 of the first magnetism collection holder 72a is provided with the protrusions 100. When the first magnetism collection holder 72a and the second magnetism collection holder 72b are assembled to each other, the recessed portions 101 which are provided in the second magnetism collection holder 72b are filled with the protrusions 100 which are provided on the first magnetism collection holder 72a, and therefore communication between the inside and the outside of the first magnetism collection holder 72a and the second magnetism collection holder 72b via the plurality of recessed portions 101 is blocked. That is, even in the case where the first magnetism collection holder 72a is provided with the recessed portions 78 and the second magnetism collection holder 72b is provided with the recessed portions 101, the peripheries of the magnetism collection rings 71a and 71b are filled with the first magnetism collection holder 72a and the second magnetism collection holder 72b, which are made of an insulator, without a clearance. Therefore, intrusion of static electricity into the first magnetism collection holder 72a and the second magnetism collection holder 72b is suppressed, which suppresses an inflow of static electricity into the magnetism collection rings 71a and 71b. Therefore, an inflow of static electricity to the Hall ICs 90 is suppressed.

The recessed portions 78 which are provided in the first magnetism collection holder 72a are filled with the engagement protrusions 77. Thus, intrusion of static electricity into the first magnetism collection holder 72a and the second magnetism collection holder 72b is also suppressed.

When the first magnetism collection holder 72a and the second magnetism collection holder 72b are assembled to each other, the engagement lugs 77a of the engagement protrusions 77 are engaged with an end portion of the first ring portion 73 on the opposite side of the second ring portion 75 in the axial direction, which allows the first magnetism collection holder 72a and the second magnetism collection holder 72b to be easily fixed to each other.

The embodiment may be modified as follows. The following other embodiments may be combined with each other as long as the embodiments do not technically contradict with each other.

In the embodiment, the Hall ICs 90 are adopted as elements that detect torque. However, the embodiment is not limited thereto. For example, ICs that include elements that detect magnetism such as magnetoresistance effect elements and magnetoimpedance elements may be adopted as elements that detect torque.

In the embodiment, the first magnetism collection holder 72a is provided with the protrusions 100. However, the second magnetism collection holder 72b may be provided with the protrusions 100. In this case, the first magnetism collection holder 72a may be provided with the recessed portions 101 corresponding to the protrusions 100. Alternatively, both the first magnetism collection holder 72a and the second magnetism collection holder 72b may be provided with the protrusions 100 and the recessed portions 101.

In the embodiment, the second magnetism collection holder 72b is provided with the engagement protrusions 77. However, the embodiment is not limited thereto. That is, the first magnetism collection holder 72a may be provided with the engagement protrusions 77, and the second magnetism collection holder 72b may be provided with the recessed portions 78. Alternatively, both the first magnetism collection holder 72a and the second magnetism collection holder 72b may be provided with the engagement protrusions 77, and both the first magnetism collection holder 72a and the second magnetism collection holder 72b may be provided with the recessed portions 78.

In the embodiment, the first magnetism collection holder 72a is provided with two protrusions 100. However, the embodiment is not limited thereto. That is, the first magnetism collection holder 72a may be provided with one or three or more protrusions 100. Meanwhile, the second magnetism collection holder 72b is provided with two recessed portions 101. However, the embodiment is not limited thereto. That is, the second magnetism collection holder 72b may be provided with one or three or more recessed portions 101.

In the embodiment, the second magnetism collection holder 72b is provided with four engagement protrusions 77. However, the embodiment is not limited thereto. That is, the second magnetism collection holder 72b may be provided with one or two or more engagement protrusions 77. In addition, the first magnetism collection holder 72a may be provided with one or two or more engagement protrusions 77.

Figure 4:
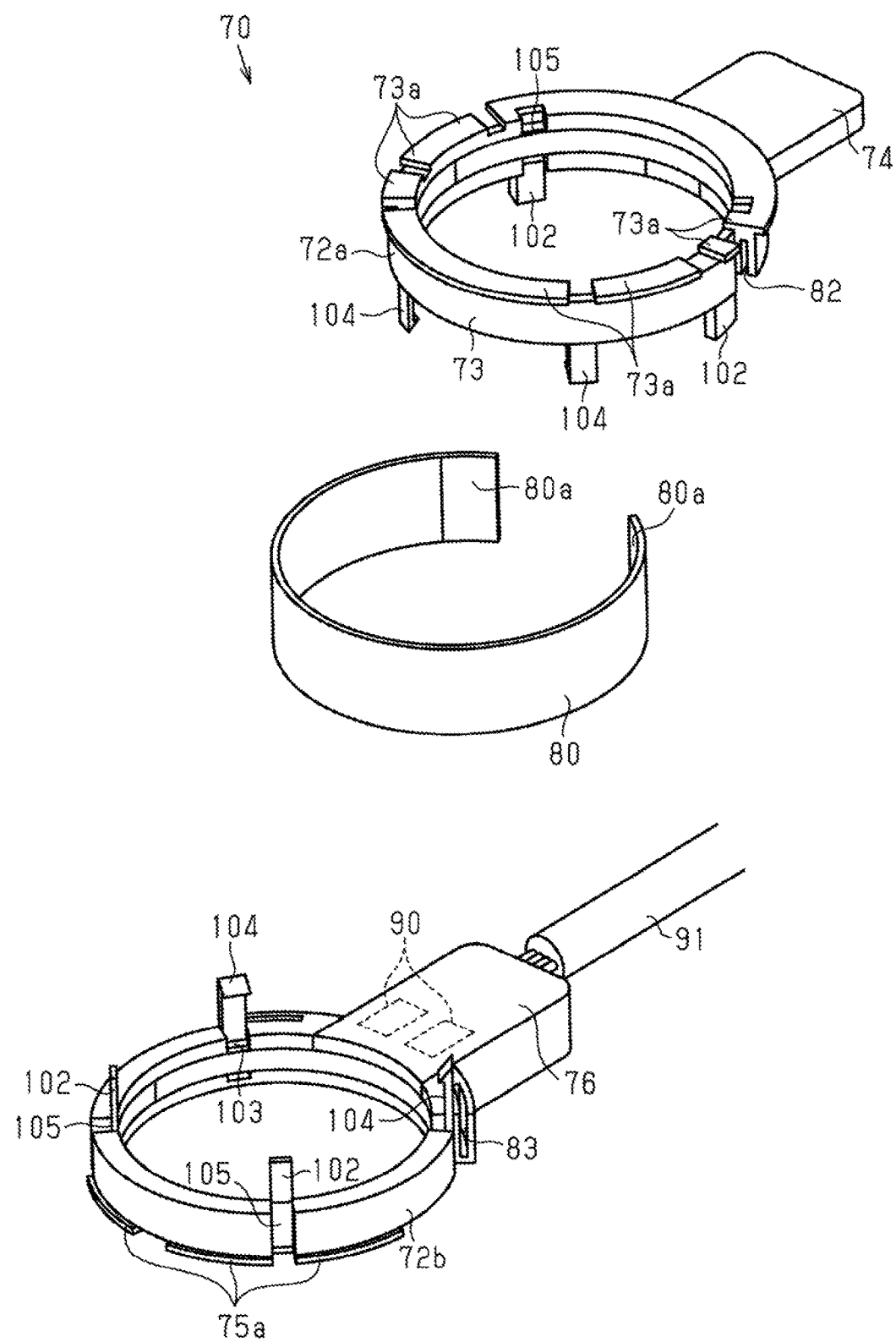
FIG. 4 is an exploded perspective view of a magnetism collection unit of a torque detection device of an electric power steering system according to another embodiment.

In the embodiment, the protrusions 100 and the recessed portions 101 are provided at positions that are different from those of the engagement protrusions 77 and the recessed portions 78 in the circumferential direction. However, the embodiment is not limited thereto. As illustrated in FIG. 4, protrusions 102 may be provided at positions that are different from those of engagement protrusions 104 in the circumferential direction, and recessed portions 103 may be provided at positions that are different from those of recessed portions 105 in the circumferential direction. For example, the first magnetism collection holder 72a is provided with two protrusions 102 and two engagement protrusions 104, and provided with recessed portions 103 and recessed portions 105 at positions that are different from those of the protrusions 102 and the engagement protrusions 104 in the radial direction. Similarly, the second magnetism collection holder 72b is provided with two protrusions 102 and two engagement protrusions 104, and provided with recessed portions 103 and recessed portions 105 at positions that are different from those of the protrusions 102 and the engagement protrusions 104 in the radial direction. When the first magnetism collection holder 72a and the second magnetism collection holder 72b are assembled to each other, the protrusions 102 which are provided on the first magnetism collection holder 72a are inserted into the recessed portions 103 which are provided In the second magnetism collection holder 72b, for example. At this time, the engagement protrusions 104 which are provided on the second magnetism collection holder 72b on the radially outer side of the recessed portions 103 are inserted into and engaged with the recessed portions 105 which are provided in the first magnetism collection holder 72a on the radially outer side of the protrusions 102.

The torque sensor 30 may be applied not only to the EPS 1 which assists linear motion of the rack shaft 15, which is caused in conjunction with a steering operation, utilizing the rotational force of the motor 20, but also to a steer-by-wire (SBW) system. In addition, the torque sensor 30 may be implemented not only as a torque sensor 30 for a front-wheel steering system, but also as a torque sensor 30 for a rear-wheel steering system or a four-wheel steering (4WS) system.

What is claimed is:

1. A torque detection device comprising:
   a permanent magnet;
   a magnetic yoke which is disposed in a magnetic field formed by the permanent magnet and a position of which relative to the permanent magnet is variable in accordance with a torsional angle of a torsion bar;
   a tubular magnetism collection unit that has a tubular magnetism collection holder, a magnetism collection ring, and a tubular magnetic shield, the magnetism collection holder being composed of a first magnetism collection holder and a second magnetism collection holder, which are disposed adjacent to each other in an axial direction and assembled to each other, to surround the magnetic yoke, the magnetism collection ring being attached to an inner peripheral surface of the magnetism collection holder to collect magnetic flux of the magnetic yoke, and the magnetic shield being fitted with an outer peripheral surface of the magnetism collection holder to be attached; and
   a magnetic sensor that detects magnetic flux from a magnetic circuit formed by the permanent magnet, the magnetic yoke, and the magnetism collection ring, wherein
   the first magnetism collection holder is provided with a first positioning recessed portion and a first protrusion, and the second magnetism collection holder is provided with a second protrusion and a second positioning recessed portion, the second protrusion being inserted into the first positioning recessed portion and the first protrusion being inserted into the second positioning recessed portion with the first magnetism collection holder and the second magnetism collection holder assembled to each other.

2. The torque detection device according to claim 1, wherein:
  the first positioning recessed portion is provided at a position that is different from that of the second positioning recessed portion in a circumferential direction of the magnetism collection holder; and
  the first protrusion is provided at a position that is different from that of the second protrusion in the circumferential direction of the magnetism collection holder.

3. The torque detection device according to claim 1, wherein;
  the first positioning recessed portion and the second positioning recessed portion are provided at the same position in a circumferential direction of the magnetism collection holder and at different positions in a radial direction of the magnetism collection holder; and
  the first protrusion and the second protrusion are provided at the same position in the circumferential direction of the magnetism collection holder and at different positions in the radial direction of the magnetism collection holder.

4. The torque detection device according to claim 1, wherein
  at least one of the first protrusion and the second protrusion includes an engagement lug that is engaged with an end surface of the first magnetism collection holder or the second magnetism collection holder in a radial direction with the first protrusion and the second protrusion inserted into the first positioning recessed portion and the second positioning recessed portion.

5. An electric power steering system comprising:
  the torque detection device according to claim 1.

* * * * *